Patented Jan. 2, 1940

2,185,207

UNITED STATES PATENT OFFICE 2,185,207

THIOCYANO-ALKYL ETHERS OF THE CYCLOHEXYL PHENOLS

John E. Livak, Midland, Mich., assignor to The Dow Chemical Company, Midland, Mich., a corporation of Michigan No Drawing. Application October 27, 1938, Serial No. 237,275

7 Claims. (Cl. 260—454)

The present invention concerns a new class of compounds, namely, the thiocyano-alkyl ethers of the cyclohexyl phenols. These compounds are for the most part low-melting solids or viscous, high-boiling, water-white liquids, substantially insoluble in water, soluble in most petroleum distillate fractions, and somewhat soluble in organic solvents generally. I have prepared representative members of this group of compounds and found that they are useful as insecticidal toxicants, particularly when dissolved in petroleum distillate fractions.

My new compounds may be prepared by reacting the halo-alkyl ether of a cyclohexyl phenol with an alkali metal thiocyanate in the presence of alcohol. For example, a suitable halo-alkyl ether and the inorganic thiocyanate are dispersed in absolute alcohol, and the resulting mixture heated to its boiling temperature and under reflux for a period of time sufficient to accomplish reaction. The reaction temperature is generally between about 75° and 90° C., although somewhat lower or higher temperatures may be employed, the reaction being carried out under autogenous pressure where temperatures above the boiling point of the solution prevail. While any suitable proportions of the halo-alkyl ethers of the cyclohexyl phenol and the metal thiocyanate may be employed, substantially equimolecular proportions thereof have been found to give the desired compounds in good yield. Following completion of the reaction, the mixture is cooled and potassium bromide separated therefrom as by filtration. The filtrate is fractionally distilled to remove alcohol, and the distillation residue diluted with water, whereupon the thiocyano-alkyl ether of the cyclohexyl phenol separates from solution as a water-immiscible oil. This oily product is recovered by extraction with a suitable solvent as benzene, and the extract fractionally distilled.

The halo-alkyl ethers employed as reactants in the preparation of my new compounds may be prepared by reacting an alkali metal salt of the substituted phenol with an equimolecular proportion of an alkylene halide or poly-methylene halide, under such conditions of temperature and pressure as favor the replacement of a single halogen atom by the cyclo-hexyl phenoxy group. The halo-alkyl ethers of cyclohexyl phenol are for the most part mobile liquids which are separated from the reaction mixtures obtained in the above process by fractional distillation.

The following examples disclose in detail the preparation of certain compounds falling within the scope of my invention, but are not to be construed as limiting the same:

Example 1

1 mol each of potassium thiocyanate and beta-(2-cyclohexyl-phenoxy)-ethyl bromide (boiling point 151° to 153° C. at 2 millimeters pressure) were dispersed in 750 milliliters of absolute alcohol and the mixture heated to its boiling temperature and under reflux for 4 hours. The reacted product was then cooled to room temperature, filtered to remove by-product potassium bromide, and the filtrate fractionally distilled to remove the major proportion of the alcohol. The residue from the distillation was poured into an excess of water, whereupon a water-immiscible oily product was separated. This oil was recovered by extraction with benzene, the extract being fractionally distilled under reduced pressure to obtain 0.69 mol of the beta-thiocyano-ethyl ether of 2-cyclohexyl phenol as a viscous oil boiling at 174° to 178° C. at 3 millimeters pressure. A 3 per cent solution of this compound in kerosene, when tested by the Peet-Grady method, substantially as described in Soap, 8, No. 4, 1932, gave a high knockdown and kill of three-day old house flies.

Example 2

Equimolecular proportions of gamma-bromopropyl ether of 2-cyclohexyl phenol (boiling point 182° to 186° C. at 4 millimeters pressure) and potassium thiocyanate were reacted together in alcohol substantially as described in Example 1 to obtain a 57 per cent yield of gamma-thiocyanopropyl ether of 2-cyclohexyl phenol as a colorless liquid boiling at 215° to 218° C. at 3 millimeters pressure. A 3 per cent kerosene solution of this compound, when tested as described in the preceding example, gave a knockdown in 10 minutes of 95 per cent and a kill in 48 hours of 90 per cent against three-day old house flies.

In a similar manner, alkali metal thiocyanates may be reacted with other halo-alkyl ethers of the cyclohexyl phenols to obtain such compounds as beta-thiocyano-ethyl ether of para-cyclohexyl phenol, beta-thiocyano-ethyl ether of meta-cyclohexyl phenol, beta-thiocyano-propyl ether of ortho-cyclohexyl phenol, gamma-thiocyano-propyl ether of para-cyclohexyl phenol, gamma-thiocyano-isobutyl ether of ortho-cyclohexyl phenol, thiocyano-pentyl ether of ortho-cyclohexyl-phenol, and the like.

I claim:

1. A thiocyano-alkyl ether of a cyclohexyl phenol.

2. A beta-thiocyano-ethyl ether of a cyclohexyl phenol.

3. A gamma-thiocyano-propyl ether of a cyclohexyl phenol.

4. A thiocyano-alkyl ether of ortho-cyclohexyl phenol.

5. Beta-thiocyano-ethyl ether of ortho-cyclohexyl phenol.

6. Gamma-thiocyano-propyl ether of ortho-cyclohexyl phenol.

7. A thiocyano-alkyl ether of a cyclohexyl phenol, wherein the alkyl residue of the thiocyano-alkyl group contains from 2 to 5 carbon atoms, inclusive.

JOHN E. LIVAK.